United States Patent [19]

Geng et al.

[11] 3,751,646

[45] Aug. 7, 1973

[54] ERROR DETECTION AND CORRECTION FOR DATA PROCESSING SYSTEMS

[75] Inventors: Hellmuth R. Geng, Schoenaich; Volkmar Goetze; Johann Hajdu, both of Boeblingen; Petar Skuin, Magstadt, all of Germany

[73] Assignee: International Business Machines Corporation, Armonk, N.Y.

[22] Filed: Dec. 22, 1971

[21] Appl. No.: 210,863

[52] U.S. Cl. .................. 235/153 A, 340/146.1 AG

[51] Int. Cl. .......................................... G06f 11/10

[58] Field of Search ............... 340/146.1, 146.1 AG, 340/146.1 AL, 172.5; 235/153 AM, 153 A

[56] References Cited

UNITED STATES PATENTS

| | | | |
|---|---|---|---|
| 3,218,612 | 11/1965 | Sorg, Jr. et al. | 340/172.5 |
| 3,231,858 | 1/1966 | Tuomenoksa et al. | 340/146.1 AL |
| 3,387,262 | 6/1968 | Ottaway et al. | 235/153 AM |
| 3,478,313 | 11/1969 | Srinivasan | 340/146.1 AL |
| 3,531,631 | 9/1970 | Burgess | 340/146.1 AG |
| 3,573,728 | 4/1971 | Kolankowsky | 340/146.1 AL |
| 3,599,146 | 8/1971 | Weisbecker | 340/146.1 AG |

*Primary Examiner*—Charles E. Atkinson
*Attorney*—Harold H. Sweeney, Jr. et al.

[57] ABSTRACT

An error detecting and correcting system is provided for a unit having an essentially subordinate structure, such as a function unit of a computer. Correct output signals are assumed for the unit and, accordingly, check bits are formed as a function of the output signals of the unit. These bits are stored with a control word associated with each operation. As the operation is being executed, the check bits are regenerated from the output signals of the function unit and are subsequently compared with the correct check bits previously stored. Non-concurrence of the check bits indicates that an error may have occurred in the unit.

8 Claims, 4 Drawing Figures

ERROR DETECTION AND CORRECTION FOR DATA PROCESSING SYSTEMS

This invention relates to an error detection and correction system for an electronic data processing system and, more particularly, to error detection and correction for the output signals of processing and function units such as the operation decoder, which has an essentially unorganized logic structure.

To increase the reliability of information in electronic data processing systems, a plurality of error checks and, although to a limited extent, error corrections are made. The best known arrangements used for this purpose are parity check circuits which generate an additional bit, the so-called parity bit, on the basis of a fixed data length. This additional bit causes the number of bits within the fixed data length to be either even or odd. The parity of this data length can be regenerated from one processing step to the next and be compared with the original one. Deviations, if any, signify that the process step just taken was erroneous.

Apart from this, methods of and circuit arrangements for, correcting errors in data groups have been known for some time. These methods and arrangements are based on the fact that single or multiple errors can be corrected by means of a special redundancy feature. The extent to which corrections are possible solely depends upon the volume of redundancy permissible in each case for a particular processing element in the data processing system. The error correcting codes used in such arrangements comprise, insofar as they relate to binary codes, one or several redundant or check bits. By means of these bits, single and multiple errors are detected and corrected.

A further error checking feature used for data transmission consists in a check number being derived from the information to be transmitted and then this number being subsequently transmitted together with the information from which it was derived. In accordance with the same criteria, a check number is generated from the information on the receiving side and compared with the transmitted one. Non-concurrence of the two check numbers signifies that an error has occurred. German Pat. No. 1,165,907, for example, relates to a method of and an arrangement for generating a check number.

This technique which is based on the principle of check numbers, has the disadvantage that it fails whenever the information to be checked is processed and simultaneously changed. Thus, it is only suitable for checking and, if necessary, for correcting information that is transmitted but not processed.

Operation decoding, which accounts for an essential part of the control of an electronic data processing system and for about a tenth of the circuits of the Central Processing Unit of such a system, has hitherto been exempted from error checking owing to its largely unorganized logic structure and its high degree of complexity. Previously, error checking and, in particular, error corrections of the output signals of the operation decoder were considered impractical in view of the substantial additional circuitry required.

This is however, a great disadvantage, since a highly complex control element with relatively extensive circuitry is liable to have a high error contingency which reduces the reliability of an electronic data processing system.

Therefore, it is the object of the present invention to eliminate this disadvantage and to provide a means for checking and, if necessary, correcting errors in complex arrangements in general, whose output signals constitute a modified pattern of the input signals.

Briefly, an arrangement for error detection and correction in electronic data processing systems is provided in which at least one check bit indicative of the error free operation of a computer function unit is stored in association with control information. Further check bits are generated from the outputs of the functional unit in response to the control information. The stored check bits and regenerated check bits are compared and any non-comparison is used for error detection or correction.

The invention is particularly advantageous for those elements of an electronic data processing system such as the operation decoder which previously, owing to their unorganized logic structure and high degree of complexity, were not accessible to checking but which can now be fully tested by means of the invention.

The foregoing and other objects, features and advantages of the invention will be apparent from the following more particular description of the invention as illustrated in the accompanying drawings.

Figure 1:
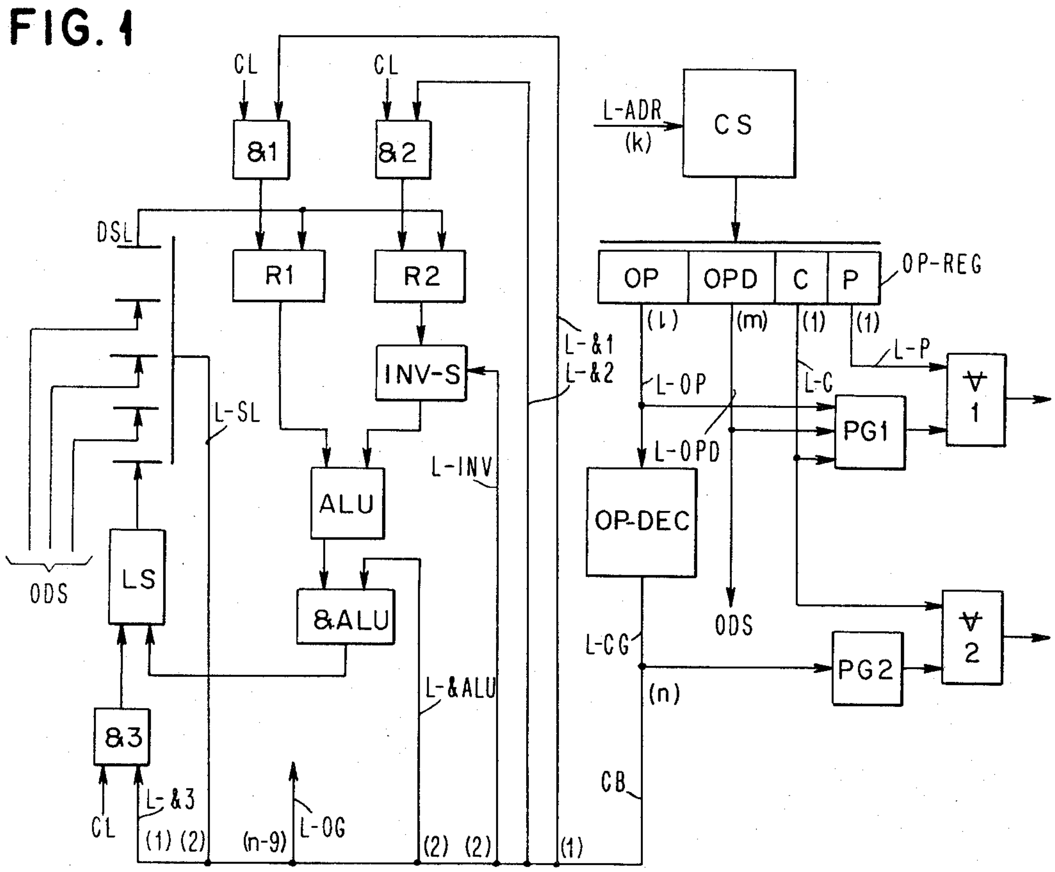
FIG. 1 is a block diagram showing a portion of an electronic data processing system in which the invention is integrated and wherein the generated check bit together with its associated control word is stored in the control storage.

The control program is stored as usual in the control storage CS of the electronic data processing system as shown in FIG. 1. For instruction fetching, the storage location receiving the next instruction to be executed is selected via address line L-ADR. During the read cycle, this instruction is read from the control storage CS and then transmitted to operation register OP-REG. The representation of this register in FIG. 1 also shows the structure of an instruction word which indicates the operation code OP in a first field consisting of L bits, the operand addresses OPD in a further field of $m$ bits, and a check bit C and a parity bit P in two adjacent 1-bit fields.

Deviating from previous techniques, the control word includes a check bit C which is represented by the parity bit generated from the totality of the output signals of the operation decoder OP-DEC for the respective instruction, assuming that the output signals supplied by this operation decoder are error-free.

Thus, check bit C is a parity bit for the output signals of the operation decoder, which must be generated in advance for each instruction word and be stored together with its instruction word in control storage CS. The parity bit P of the instruction word, which is generated taking into account the check bit C, together with the associated instruction word is also stored in control storage CS.

For checking, the instruction word read from the control storage and stored in operation register OP-REG is regenerated in parity generator PG1 from the L bits of the operation code, the m bits of the operation addresses and the check bit C which are transmitted via lines L-OP, .L-OPD and L-C, respectively. It is compared in the connected EXCLUSIVE OR gate 1 with the stored parity bit P which, via line L-P, is also transmitted to said gate. Non-concurrence of the two parity bits results in EXCLUSIVE OR gate 1 generating an output signal from the different input information, which signifies a parity error. In this manner, it is possible to check the instruction word within the control information flow above the operation decoder OP-DEC.

The output signals of the operation decoder, which are generally control signals for opening and closing control gates, control the data flow from or to the processing elements, such as the operand registers R1 and R2, the arithmetic and logical unit ALU, the local storage LS and, for example, the inverter switch INV-S. In FIG. 1, these control gates are designated as &1 to &3 and &ALU. The gate control signals are transmitted to said gates via lines L–&1, L–&2, L–&3 and L–&ALU. Selector DSL, selecting other data sources, and inverter switch INV-S, modifying the input data, are also controlled by means of the output signals of the operation decoder. As shown in FIG. 1, these control signals are applied to the connected selectors via lines L-SL and L-INV. The remaining *n*–9 control lines of the n output lines of the operation decoder are connected to further control elements which are essentially gate circuits.

The operation decoder which previously was not accessible to checking or which, owing to its high degree of complexity and the unorganized logic structure of its circuits, could only be checked utilizing excessive circuitry, can now be checked by means of the check bit C. To this end, the parity bit is regenerated in a second parity generator PG2 from the n output bits of the operation decoder OP-DEC. Subsequently, the check bit C stored in operation register OP-REG is compared with the regenerated parity bit in EXCLUSIVE OR gate 2. The two check bits concur if the output signal pattern of the operation decoder is correct. In such a case, the same input signal is applied to the two inputs of the EXCLUSIVE OR gate 2, so that said gate is prevented from supplying an output signal or supplies a signal corresponding to a binary zero.

Figure 2:
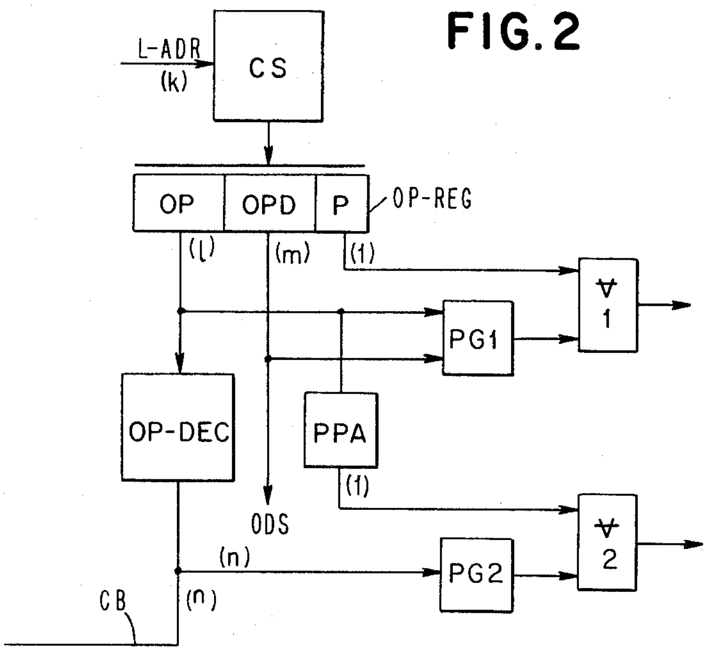
FIG. 2 is a block diagram of a modified checking arrangement in which the check bit is stored in a separate storage.

There may also be cases where the organization of an electronic data processing system or the control storage of the system does not permit the check bit C to be stored with its instruction word in the control storage. FIG. 2 shows an arrangement where the check bit C can be stored elsewhere, while remaining logically related to its instruction word. Parity generator PG1 again receives input data in an orthodox manner, that means the parity generator forms the parity bit without considering the check bit C.

As the same operation code OP invariably necessitates the same output signal pattern on the output of the operation decoder OP-DEC, irrespective of the operands to be processed, the check bits C need not necessarily be associated with a particular instruction word. It is rather sufficient for these bits to be associated with a particular operation code OP. Therefore, check bits C can be stored in a further storage PPA which is addressed by the operation code OP. By means of a particular operation code OP as an address, the check bit associated with the operation code can be read from the storage location thus addressed. As the handling of this check bit does not differ from that described in connection with FIG. 1, further details have been omitted.

Figure 3:
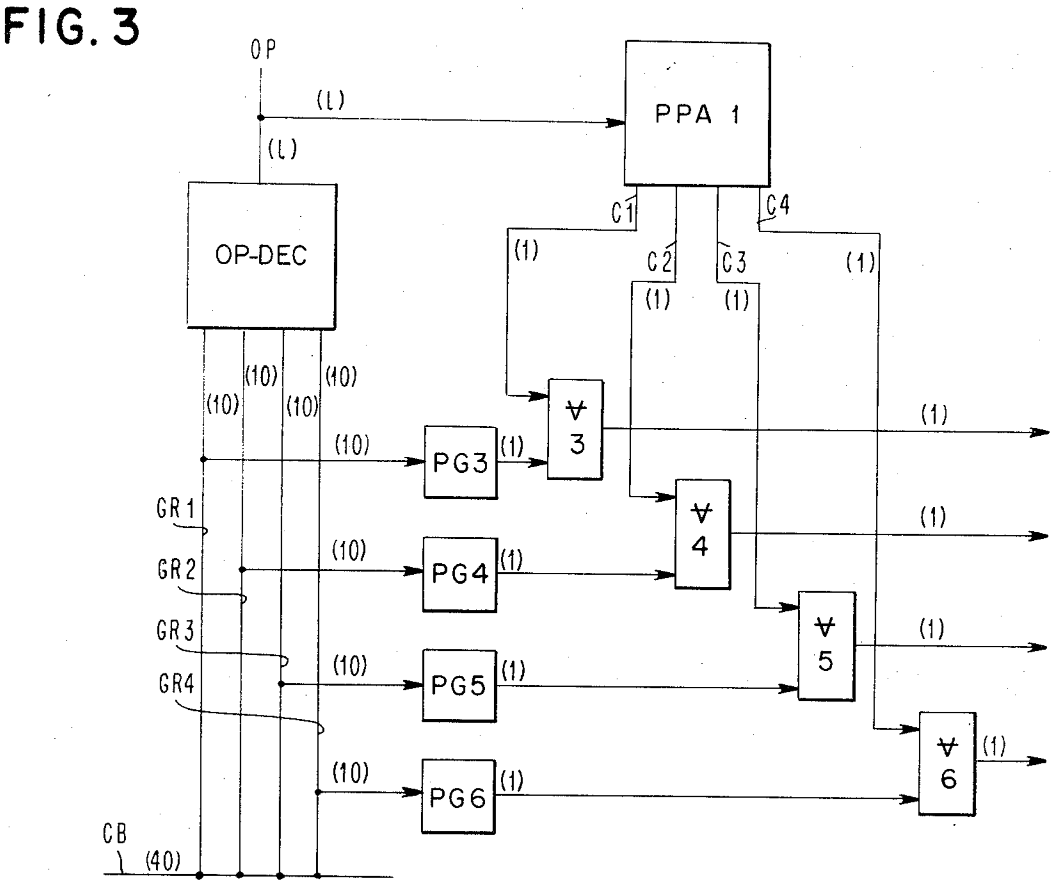
FIG. 3 is a block diagram of a modified checking arrangement in accordance with the invention, in which the check bits are subdivided into groups.

Checking the control information, to the extent to which it occurs as an output signal pattern of an operation decoder, by means of only one check bit, entails a high degree of unreliability where the number n of the output lines to be checked exceeds a value of 10, for example. Generally, even in small scale electronic data processing systems, the operation decoder comprises 40 or more output lines. It is advantageous to check the information transmitted on these lines by linking the lines in groups each consisting of 10 lines and to compute or generate a check bit peculiar to each group. How this subdivision is realized is shown in FIG. 3. The assumed 40 output lines of the operation decoder OP-DEC are subdivided into groups GR1 to GR4 each comprising 10 lines. For each operation code OP, the check bit storage PPA1 contains four check bits C1 to C4 which are each associated with a group GR1 to GR4. Additionally, each group is provided with a parity generator of its own. So, for example, parity generator PG3 is allocated to the first group GR1 and parity generator PG6 to the last group GR4. If an erroneous bit occurs in one or several of these groups, the associated parity generator generates a check bit deviating from the associated stored check bit Ci, and the corresponding EXCLUSIVE OR gate generates an output signal signifying an error for this group. In the case of applications which do not call for the erroneous group to be distinguished, the outputs of the EXCLUSIVE OR gates 3 to 6 may be linked via a further OR gate (not shown), whose output signal is used for error indication.

In electronic data processing systems, which from necessity must operate without interruption, such as the systems used for real-time processing of space flight data, it is advantageous to provide a circuit ECC-LOG for error correction, in addition to the error detecting and checking means of the operation decoders.

Circuit arrangements for detecting and correcting errors in data groups are known per se and generally comprise a redundancy feature by means of which single or multiple errors are detected and corrected. The scope of detection and correction is solely dependent upon the volume of redundancy permissible in each case.

The error correcting codes (ECC) used in these circuit arrangements comprise, insofar as they relate to binary codes, redundant bits which are also called check bits. These bits are used for error detection and correction. Thus, the effectiveness of all error detecting codes is governed by the volume of redundancy employed, that means the higher the number of redundant correcting bits in a binary data group, the more erroneous bits within this group can be corrected.

This knowledge can be utilized to good effect for correcting the output signals of the operation decoder. In accordance with FIG. 4, an error correcting storage ECS, which is addressed by the respective operation code OP, is used for this purpose. By means of a correct input signal pattern on the output of the operation decoder OP-DEC, the check bits generated according to the selected error correcting code ECC are generated in advance for the respective operations and are stored under the address of the associated operation code OP in error correcting storage ECS. If the operation code is decoded by the operation decoder in the course of the execution of an instruction, the output signals of this operation decoder are transmitted to an error detecting and correcting logic circuit ECC-LOG on the one hand, and the operation code is used as an address for addressing the error correcting storage ECS on the other. The error correcting bits of this address which are generated for a correct output signal pattern of the operation decoder and which are associated with this operation code, are also transmitted to the error detecting and correcting logic circuit ECC-LOG. If the output signal pattern consisting of a particular bit configuration derived from the totality of the output lines shows an erroneous bit value in one or several bit positions, the error detecting and correcting logic circuit can correct the erroneous bit values in accordance with its design, utilizing the check bits transmitted from the error correcting storage ECS, and indicate whether the errors concerned are single SE, double DE or n errors NE. For error indication, an error indicator EI is provided, which via p lines, is connected to the error detecting and correcting logic circuit ECC-LOG. It is once again pointed out that the small letters in brackets on the inputs and outputs of the registers and functional elements generally indicate the number of lines.

Figure 4:
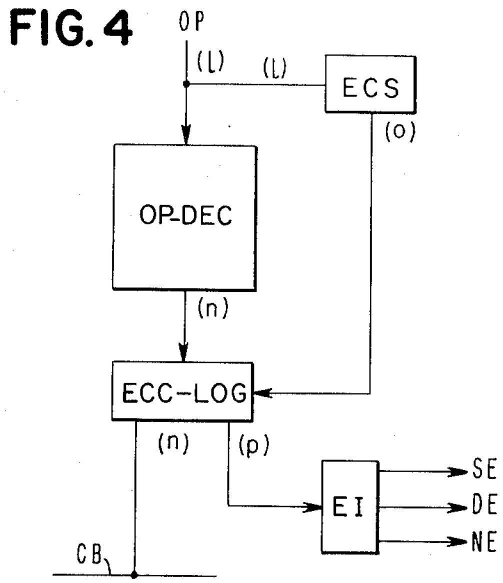
FIG. 4 is a block diagram of a modified checking arrangement in accordance with the invention, including an error correcting unit.

In the embodiments of FIGS. 2 to 4, the storages PPA, PPA1 and ECS are provided for storing the check bits. These storages may have an arbitrary physical structure and function as read/write storages or read-only memories, with the choice of storage being essentially dependent upon the technology and functional concept of the data processing system employed.

While the invention has been particular shown and described with reference to a preferred embodiment thereof, it will be understood by those skilled in the art that the foregoing and other changes in form and detail may be made therein without departing from the spirit and scope of the invention.

What is claimed is:

1. In an error detection system for a functional unit which responds to information within a data processing system;

means for storing at least one check bit indicative of the error free operation of said functional unit in association with said information;

means for regenerating the check bits from the output of said functional unit after operating in response to said information;

means for comparing the stored check bits with the regenerated check bits thereby detecting the errors indicated by any non-comparison.

2. A system in accordance with claim 1, wherein said functional unit is the operation decoder and said information is the operation code of the control of a data processing system.

3. A system in accordance with claim 2, wherein said means for storing at least one check bit comprises a control word storage where said at least one check bit is stored in a field of the associated control word.

4. A system in accordance with claim 2, wherein said storage means includes a separate storage for said at least one check bit;

means for fetching said check bit(s) together with said operation code acting as an address.

5. A system according to claim 1, wherein said functional unit has its output lines subdivided into groups, at least one check being provided for each group and the check bits of each group being separately stored in said means for storing a plurality of said regenerating means are provided one for each of said groups and a plurality of said comparison means are provided one for each of said groups so that errors can be detected by said non-comparison.

6. A system in accordance with claim 3, wherein a parity bit is generated from the control word which includes said at least one check bit and is then stored.

7. A system in accordance with claim 6, wherein said parity bit is regenerated by said regenerating means from the control word and is compared in said comparison unit said stored parity bit.

8. A system according to claim 6, wherein the control word has its outputs arranged in groups, a parity bit being provided for each group and being separately stored, a plurality of said regenerating means are provided one for each of said groups and a plurality of said comparison means are provided one for each of said groups so that errors can be detected by said non-comparison.

* * * * *

PO-1050
(5/69)

UNITED STATES PATENT OFFICE
CERTIFICATE OF CORRECTION

Patent No. 3,751,646 Dated August 7, 1973

Inventor(s) Hellmuth R. Geng, Volkmar Goetze, Johann Hajdu, Petar Skuin

It is certified that error appears in the above-identified patent and that said Letters Patent are hereby corrected as shown below:

Column 6, line 37, after the word "unit" insert the word --with--.

Signed and sealed this 27th day of November 1973.

SEAL)
ttest:

DWARD M.FLETCHER,JR.
ttesting Officer

RENE D. TEGTMEYER
Acting Commissioner of Patents 623-2721-0